United States Patent [19]

Blaisdell et al.

[11] 4,130,081

[45] Dec. 19, 1978

[54] ACTIVATION MEANS FOR FLASHLAMP ARTICLE

[75] Inventors: Ronald G. Blaisdell, Saugus; Harold H. Hall, Jr., Marblehead; Harold L. Hough, Beverly, all of Mass.

[73] Assignee: GTE Sylvania Incorporated, Danvers, Mass.

[21] Appl. No.: 803,563

[22] Filed: Jun. 6, 1977

[51] Int. Cl.² ............................. G08B 7/08; G08B 3/14
[52] U.S. Cl. ............................................ 116/5; 116/7; 116/83; 116/87; 116/114 R
[58] Field of Search ................. 116/5, 4, 15, 105, 104, 116/101, 7, 2, 85, 86, 83, 87, 88, 89, 114 R; 362/11, 13, 14, 15; 102/86.5, 70 R; 340/228, 274; 431/95 R, 95 A, 93

[56] References Cited

U.S. PATENT DOCUMENTS

| 3,443,518 | 5/1969 | Cross | 102/24 HC |
| 3,714,647 | 1/1973 | Litman | 340/416 |

Primary Examiner—S. Clement Swisher
Assistant Examiner—Denis E. Corr
Attorney, Agent, or Firm—Lawrence R. Fraley

[57] ABSTRACT

A flashlamp article activation means which includes a casing, an activator movably oriented within the casing, and an engagement member for engaging the activator to cause it to move within the casing and activate the flashlamp article positioned on the casing. A helical spring is used to bias the activator away from the article. An ideal use for the invention is within an intrusion alarm system.

21 Claims, 6 Drawing Figures

ACTIVATION MEANS FOR FLASHLAMP ARTICLE

CROSS REFERENCE TO COPENDING APPLICATIONS

Two applications listed under Ser. Nos. 803,564 and 803,565 were filed June 6, 1977 are assigned to the assignee of the present invention. Ser. No. 803,565, entitled "Flashlamp Assembly for Providing Highly Intense Audible and Visual Signals" (A. C. Bouchard et al), defines a flashlamp article having a combustible member associated with the flashlamps of the article. An activation means is also defined for activating the article. Ser. No. 803,564, entitled "Activating Mechanism for Flashlamp Article" (A. C. Bouchard et al), defines several various activating mechanisms for activating a flashlamp article, said mechanisms including features such as time delay means, heat sensing means, etc.

BACKGROUND OF THE INVENTION

The invention relates to activation means and particularly to means for activating flashlamp articles.

The activating mechanisms described in the aforementioned applications are especially suited for triggering a flashlamp unit located within a flashlamp article. In doing so, the fired unit (or units) provides a highly intense visible signal in the form of a flash. As defined in Ser. No. 803,565, this flash may in turn activate a combustible member (e.g. a pyrotechnic) which is located near the lamp and receives the intense energy therefrom. The highly intense noise emitted from the pyrotechnic may serve two purposes: (1) to scare away a prospective intruder; and (2) to trigger a suitable sound detector located within range of the pyrotechnic.

In the alarm systems shown in U.S. Pat. Nos., 3,714,647 (A. L. Litman) and 3,805,257 (A. L. Litman et al), the flashlamp article is used to activate a photocell or similar electrical component to in turn trigger a suitable alarm.

The activation means of the instant invention provides a highly desired feature over the several activating mechanisms mentioned above, that feature being the substantial prevention of accidental firing of the flashlamp article during positioning of the article on the mechanism. Accidental firing would result in the unnecessary waste of material and also prove highly inconvenient to the alarm system's operator, who may be required to readjust the respective sound or light detecting apparatus associated with the flashlamp article.

It is believed therefore that an activator means which provides the above feature would constitute an advancement in the art.

OBJECTS AND SUMMARY OF THE INVENTION

It is therefore a primary object of the present invention to enhance the flashlamp article activation art by providing an activation means possessing the above desired feature. It will also be understood from the following detailed description that the present invention possesses other desired features, including new and unique means for effecting activation thereof.

These and other objects are achieved by the activation means of the instant invention which comprises a casing, an activator movably oriented within the casing to occupy at least two positions therein, and engagement means for engaging the movable activator to cause it to move within the casing. A biasing means is employed to bias the activator toward one of the positions. A means for securing the invention to an external surface also comprises part of the invention.

DETAILED DESCRIPTION OF THE PREFERRED EMBODIMENTS

Figure 1:
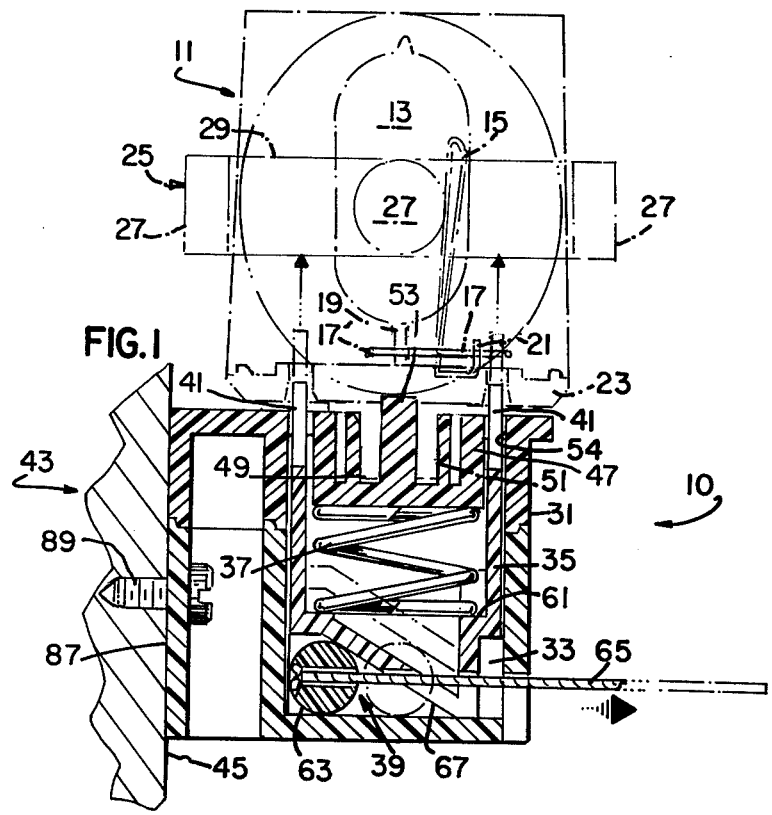
FIGS. 1–5 are side elevational views, in section, of various embodiments of the invention.

For a better understanding of the present invention together with other and further objects, advantages and capabilities thereof, reference is made to the following disclosure and appended claims in connection with the above described drawings.

With reference to the drawings, there is shown an activation means 10 in accordance with one embodiment of the invention. Means 10 is adapted for activating a flashlamp article 11 which is preferably a multi-lamp photoflash article currently available on the market under the name "MAGICUBE". This well known and highly reliable article is produced and sold under said name by the assignee of the present invention. Typically, article 11 includes four percussively-ignitable flashlamps 13 (one shown) and a prestressed striker spring 15 associated therewith. Spring 15 includes a striker arm 17 which moves to strike and deform the primer 19 of lamp 13 when released from its retained position, said retention maintained by an upstanding element 21. Arm 17 is shown in the striking position by numeral 17' in FIGS. 1, 2, and 5.

Spring 15 and primer 19 are preferably mounted within a base portion 23 of article 11. As defined in copending application under Ser. No. 803,565 (A. C. Bouchard et al), article 11 can further include at least one combustible member 25 positioned in operative relationship to one of the flashlamps 13 for receiving the energy therefrom in the form of light and/or heat. Accordingly, combustible member 25 will provide a highly intense audible signal in response to receipt of this energy. Member 25 comprises at least one pyrotechnic device 27 located adjacent each lamp 13. According to one embodiment defined in Ser. No. 803,565, each device 27 may be positioned in a closed strap 29 which encompasses the body of the flashlamp article.

With regard to the present invention, by "intense audible" is meant an output of at least 85 decibels as measured at about 25 centimeters, and by "intensely visible" is meant flashing signals similar to those emitted by the percussive flashlamps used in "MAGICUBE" articles. Each lamp typically emits a visible flash of about 2000 beam candle power seconds with a peak intensity occurring at about 5 to 10 milliseconds.

An example of pyrotechnic devices 27 suitable for use with the invention are those available on the market under the name "SUPER BANG CAPS", which are currently distributed by the Ohio Art Company, Bryan, Ohio. Each of these caps contains a pyrotechnic composition of potassium chlorate, red phosphorus, manganese dioxide, sand, and glue. The content of each cap is less than 0.20 grains. Pyrotechnic compositions known as "Armstrong's Mixtures" may also be used with the present invention. These compositions typically include potassium chlorate within the range of about 67 to 81 percent, phosphorus from about 8 to 27 percent, sulfur from about 3 to 9 percent, and precipitated chalk from about 3 to 11 percent. All of these percentages are by weight of the total mixture.

The above formulations provide an audible output signal within the range of about 130 to 155 decibles as measured at a distance of about 25 centimeters. These formulations are not meant to limit the invention, however, in that other pyrotechnic mixtures are satisfactory, provided each is capable of receiving the intense energy from the flashlamps and providing the highly intense audible signals desired. As an alternate embodiment, it may be desirable to use a pyrotechnic mixture which emits a whistling or similar sound. Such compositions are also well known in the art and contain potassium chlorate, potassium perchlorate, potassium nitrate, red gum, gallic acid, potassium picrate, potassium benzoate, potassium dinitrophenate and sodium salicylate. These formulations are shown on pages 376 and 377 of the book entitled "Military and Civilian Combustible Pyrotechnics" by Dr. Herbert Ellern, copyright 1968 by the Chemical Publishing Co., Inc. The aforementioned "Armstrong's Mixtures" are defined on page 353 of this text.

Figure 5:
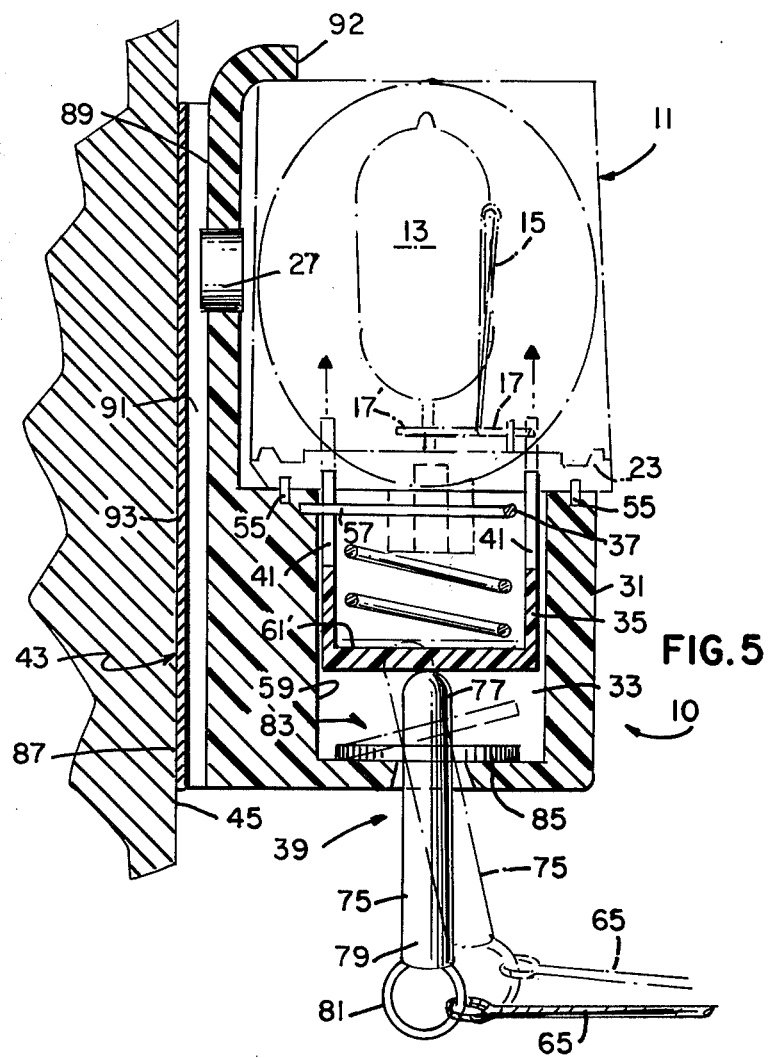
Figure 6:
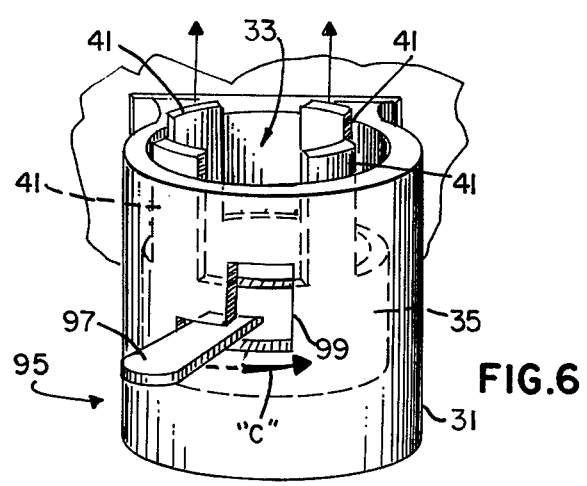
FIG. 6 represents a preferred embodiment of a locking means for use with the invention.

Activation means 10 comprises a casing 31 which defines a chamber 33 therein, an activator 35 movably oriented within chamber 33, biasing means 37 for biasing activator 35 to a first, nonfiring position, and engagement means 39 for engaging activator 35 to cause it to move from the first, nonfiring position to a second position. This second position (shown in phantom in FIGS. 1,2, and 5) represents the firing position for means 10 wherein an upstanding engagement member 41 has moved to engage and release arespective striking arm 17 on spring 15. Release of arm 17 effects successful firing of the flashlamp 13 associated therewith. As shown in FIG. 6, activator 35 includes four members 41 when the activator is used to fire a flashlamp article 11 containing four flashlamps 13 therein. Activation means 10 further includes means 43 for securing means 10 to an external surface 45, (e.g. door or window casement), said securing means to be described.

With particular reference to FIG. 1, means 10 further includes seating means 47 located at one end of casing 31 and adapted for having flashlamp article 11 positioned thereon. Means 47 includes an opening 49 therein for accommodating the stud portion 51 typically found on most "MAGICUBE" articles. Means 47 also preferably includes a projection member 53 adapted for inserting within an orifice provided within stud portion 51. Seating means 47 also includes an opening 54 for each member 41 to pass through prior to engaging striking arm 17. Biasing means 37 is shown as engaging a bottom surface of seating means 47. With regard to FIG. 2, casing 31 is shown as not including a seating means for accommodating article 11. In this embodiment, article 11 is preferably integrally connected (e.g. cemented) to casing 31, thus making the combined assembly a throwaway component once flashlamps 13 have been fired. Biasing means 37 thus engage the lower part of base 23 to bias activator 35 toward the first, non-firing position. In the embodiment of FIG. 5, article 11 is aligned on casing 31 using a plurality (e.g. four) of alignment pins 55 mounted in the casing and adapted for inserting within corresponding apertures in base 23. Biasing means 37 is preferably a helical spring which maintains engagement with an internal wall 61 (61' in FIG. 5) of activator 31 to act thereagainst. It is within the scope of the invention to use biasing means other than a helical spring, however, including resilient elements such as a compressible sponge or rubber member. In FIG. 5, it is preferred to securely position an end 57 of spring 37 within an internal wall 59 of casing 31. This prevents spring 37 from becoming removed from within casing 31 when article 11 is removed therefrom.

Several forms of engagement means 39 for use with the invention are shown in FIGS. 1-5. In FIG. 1, means 39 comprises a spherical member 63 which has a cord 65 affixed thereto. Activator 35 includes an end surface 67 which is established at an angle $\theta$ (FIG. 2) with the upward movement (direction "a") of activator 35. This angle is preferably within the range of about 25° to 35°. Spherical member 63 engages angular surface 67 and causes activator 35 to move in direction "a" in response to an increase in tension or cord 65. Such an increase may be the result of movement of an externally located surface, e.g. door or window, to which cord 65 is attached. The second (or activating) position of activator 35 is shown in phantom in FIGS. 1,2, and 5.

Figure 3:
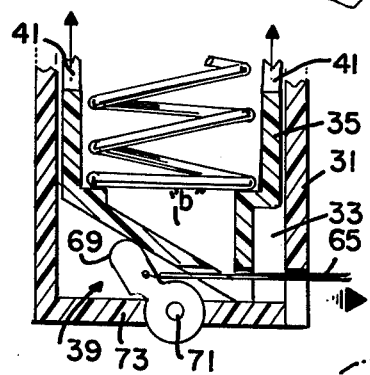
Figure 4:
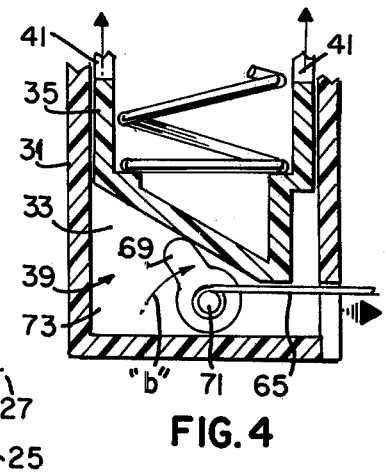

In FIGS. 3 and 4, engagement means 10 comprises a pivoted member 69 which is pivotally oriented substantially within chamber 33 and has a cord 65 affixed thereto. Cord 65 is shown in FIG. 4 as being wound about a shaft 71 upon which member 69 pivots. The shaft 71 for member 69 in FIG. 3 is mounted within a lower wall 73 of casing 31 while shaft 71 in FIG. 4 is mounted within a side wall 73' of the casing. In either case, an increase in tension causes pivoted member 69 to pivot (in direction "b") and cause actuator 35 to move toward article 11. It is preferred in the present invention to provide some form of a stop (not shown) either on angular surface 67 or the pivoted member 69 itself to prevent rotation of the member beyond a point which would prevent its return subsequent to firing article 11.

In FIG. 5, engagement means 39 comprises an elongated member 75 having a first end 77 in engagement with activator 35 and a second opposing end 79 extending from casing 31. A cord 65 is secured (e.g. hooked) to a ring 81 positioned within second end 79. Means 39 further includes means 83 for pivoting elongated member 75, said means preferably comprising an annular ring member 85 positioned about elongated member 75 between ends 77 and 79. Ring 85 causes member 75 to pivot about a point within chamber 33 whereby member 75 will be upwardly displaced to cause actuator 35 to move likewise.

Figure 2:
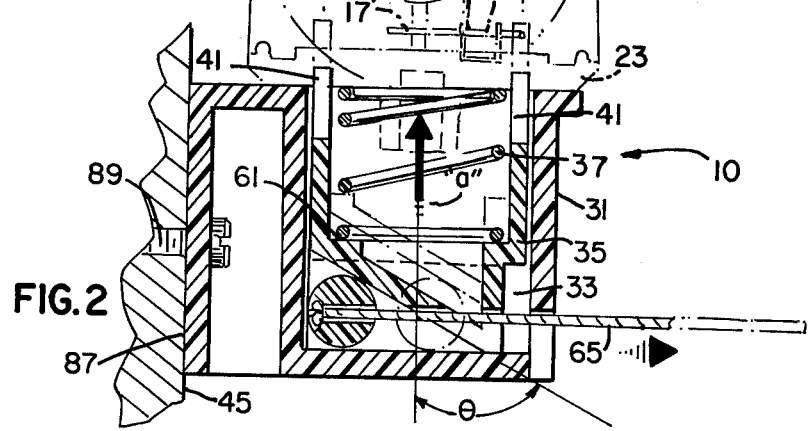

One embodiment of a securement means 43 for the invention is shown in FIGS. 1,2, and 5. Herein, means 43 constitutes providing casing 31 with a substantially flat surface 87 which is adapted for mating with external surface 45. A screw 89 may thus be used to fasten casing 31 to surface 45 in the manner shown in FIGS. 1 and 2 or an adhesive (not shown) may be employed. The adhesive, preferably a two-sided tape, binds casing 31 to external surface 45.

In FIG. 5, casing 31 includes an upstanding wall 89 which includes a longitudinal channel 91 therein. Within wall 89 is positioned at least one of the aforementioned pyrotechnic devices 27, said device being adjacent one of the lamps 13 as a result of wall 89 being located adjacent article 11. Pyrotechnic device 27 is positioned within wall 89 to have access to channel 91 whereby the audible output from device 27 will pass through the channel. A flat metallic strip 93 may be used against surface 45. Wall 89 includes a retaining means (portion 92) projecting from wall 89 and engaging the top of article 11 when the article is positioned on casing 31.

In FIG. 6 is illustrated a means 95 for locking activator 35 in the first (non-firing) position. Means 95 comprises a tab member 97 which extends from activator 35 and is capable of occupying a first (or locking) position within a slot 99 in the side of casing 31. This position is shown in FIG. 6. Subsequent movement of tab 97 in slot 99 (in direction "c") effects release of activator 35 in order that means 39 can effect upward movement thereof.

The preferred material for members 31, 35, 47, 63, 69 and 75 is high-impact polystyrene. This preferred material for helical spring 37 is 0.030 music wire. Member 31 may also be polypropylene and activator 35 polycarbonate.

Thus there has been shown and described an activation means for activating a flashlamp article positioned on the means. By employing a biasing means to assure return of the invention's activator subsequent to firing of the flashlamp article, accidental firing of a second article placed on the invention has been substantially prevented. The present invention is also relatively easy and safe to operate, and inexpensive to manufacture.

As described, the invention is highly reliable and also eliminates the necessity for electrical circuitry. It is understood however, that electrically-activated flashbulbs could be used. For example, activation means 10 could include circuitry therein which is electrically connected to normal line current or casing 31 could contain a battery with sufficient power to trigger such flashbulbs when a switch or corresponding pair of contacts are closed (such as by upward movement of activator 35). It is understood that high voltage flashlamps which receive electrical activation from a piezoelectric crystal or similar power source can also be successfully used in the invention. For example, the upwardly displaced activator 35 could be used to mechanically deform a piezoelectric cyrstal located within casing 31 to in turn supply the necessary electrical firing voltage to such lamps.

While there have been shown and described what are at present considered the preferred embodiments of the invention, it will be obvious to those skilled in the art that various changes and modifications may be made therein without departing from the scope of the invention as defined by the appended claims.

What is claimed is:

1. Activation means for activating at least one flashlamp unit located within a flashlamp article including a base portion, said activation means comprising:
   a casing defining a chamber therein, said casing adapted for having said base portion of said flashlamp article positioned thereon;
   an activator member movably oriented within said chamber of said casing for occupying a first, non-firing position and a second position therein and including at least one upstanding engagement member thereon, said activator member effecting firing of said flashlamp unit within said flashlamp article when said article is positioned on said casing and said activator member occupies said second position;
   biasing means located within said casing and engaged to said activator member, said biasing means continuously biasing said activator member toward said first, non-firing position for returning said activator member thereto subsequent to said firing of said flashlamp unit;
   engagement means movably positioned within said chamber for engaging said activator member to effect movement of said activator from said first position to said second position, said engagement means effecting said movement in response to external actuation thereof; and
   means for securing said activation means to an external surface.

2. The activation means according to claim 1 wherein said casing includes an upstanding wall adapted for being positioned substantially adjacent said flashlamp article, said wall having at least one combustible member therein adapted for receiving energy from said flashlamp unit in the form of light and/or heat and providing a highly intense audible signal in response to receipt of said energy.

3. The activation means according to claim 2 wherein said combustible member comprises at least one pyrotechnic device.

4. The activation means according to claim 2 wherein said upstanding wall includes a longitudinal channel therein, said combustible member having access to said channel.

5. The activation means according to claim 2 wherein said upstanding wall includes retaining means thereon, said retaining means projecting from said upstanding wall and adapted for retaining said flashlamp article onto said activation means.

6. The activation means according to claim 1 further including seating means located at one end of said casing and adapted for having said base portion of said flashlamp article seated thereon.

7. The activation means according to claim 6 wherein said biasing means is further engaged to said seating means.

8. The activation means according to claim 6 wherein said seating means includes at least one opening therein for permitting said upstanding engagement member of said activator member to pass therethrough during movement of said activator from said first position to said second position.

9. The activation means according to claim 1 wherein said activator member includes an end surface established at an angle with respect to the direction of movement of said activator member within said chamber of said casing, said engagement means engaging said angular end surface to effect said movement of said activator member.

10. The activation means according to claim 9 wherein said engagement means comprises a substantially spherical member having a cord affixed thereto and extending from said casing, said spherical member moving within said chamber of said casing to effect said movement of said activator member in response to an increase in the tension of said cord.

11. The activation means according to claim 9 wherein said engagement means comprises a pivoted member pivotally oriented within said chamber of said casing and having a cord affixed thereto and extending from said casing, said pivoted member pivoting within said chamber to effect said movement of said activator member in response to an increase in the tension of said cord.

12. The activation means according to claim 1 wherein said engagement means comprises an elongated member having a first end engaging said activator and a second end opposing said first end and extending from said casing, said engagement means further comprising means for pivoting said elongated member about a point within said chamber whereby said elongated member will effect said movement of said activator.

13. The activation means according to claim 12 wherein said means for pivoting said elongated member comprises a substantially annular member located within said chamber and positioned about said elongated member between said first and said second opposing ends.

14. The activation means according to claim 12 wherein said second end includes a cord affixed thereto, said elongated member pivoting about said point within said chamber to effect movement of said activator member in response to an increase in the tension of said cord.

15. The activation means according to claim 1 wherein said casing includes a substantially flat surface and said means for securing said activation means to an external surface comprises providing said flat surface with a quantity of adhesive thereon, said adhesive adapted for bonding said flat surface to said external surface.

16. The activation means according to claim 1 further including means for locking said activator member in said first position within said chamber of said casing.

17. The activation means according to claim 16 wherein said casing includes a slot therein, said locking means comprising a tab member extending from said activator member and adapted for occupying first and second positions within said slot, said tab member locking said activator in said first position within said chamber when said tab member occupies said first position within said slot.

18. The activation means according to claim 1 wherein said base portion of said flashlamp article is integrally connected to said casing.

19. The activation means according to claim 18 wherein said biasing means further engages said base portion.

20. The activation means according to claim 18 wherein said biasing means includes an end portion fixedly positioned within said casing.

21. The activation means according to claim 1 wherein said biasing means comprises a helical spring.

* * * * *